Jan. 14, 1958 J. W. SOUTHWICK 2,820,148
WAVE MOTOR AND ASSOCIATED MECHANISM
Filed March 18, 1957 2 Sheets-Sheet 1
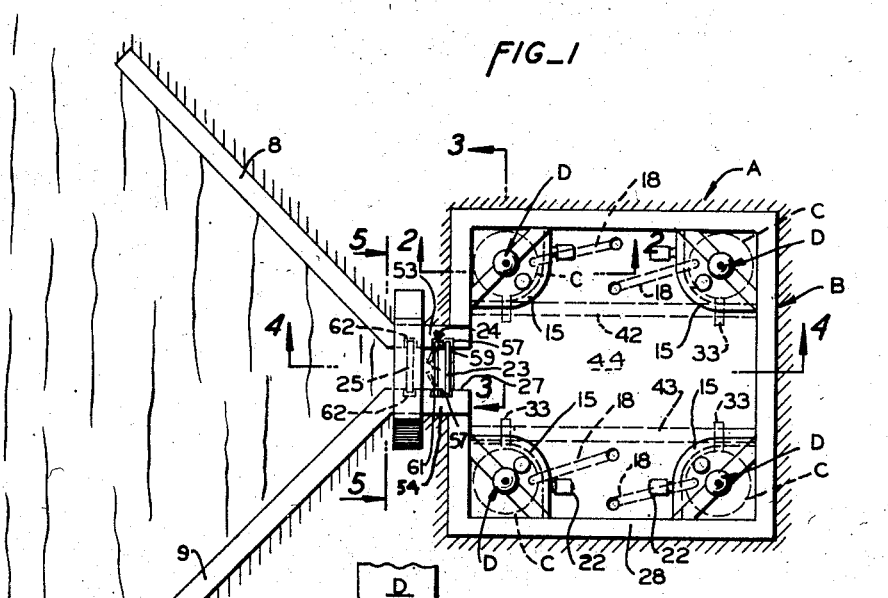
FIG_1
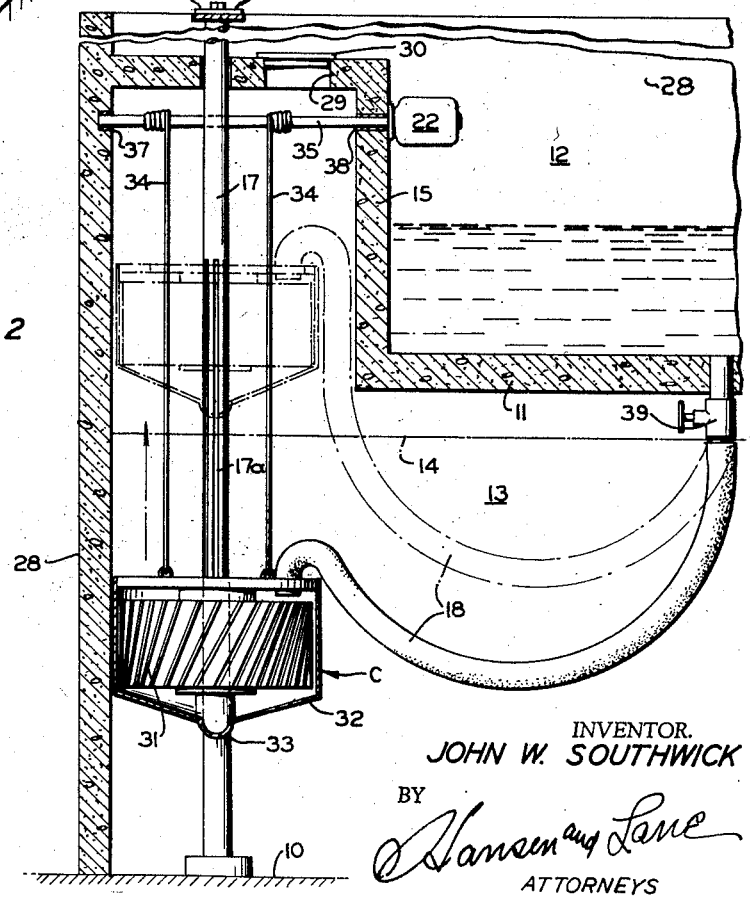
FIG_2
INVENTOR.
JOHN W. SOUTHWICK
BY
*Hansen and Lane*
ATTORNEYS Jan. 14, 1958 — J. W. SOUTHWICK — 2,820,148
WAVE MOTOR AND ASSOCIATED MECHANISM
Filed March 18, 1957 — 2 Sheets-Sheet 2
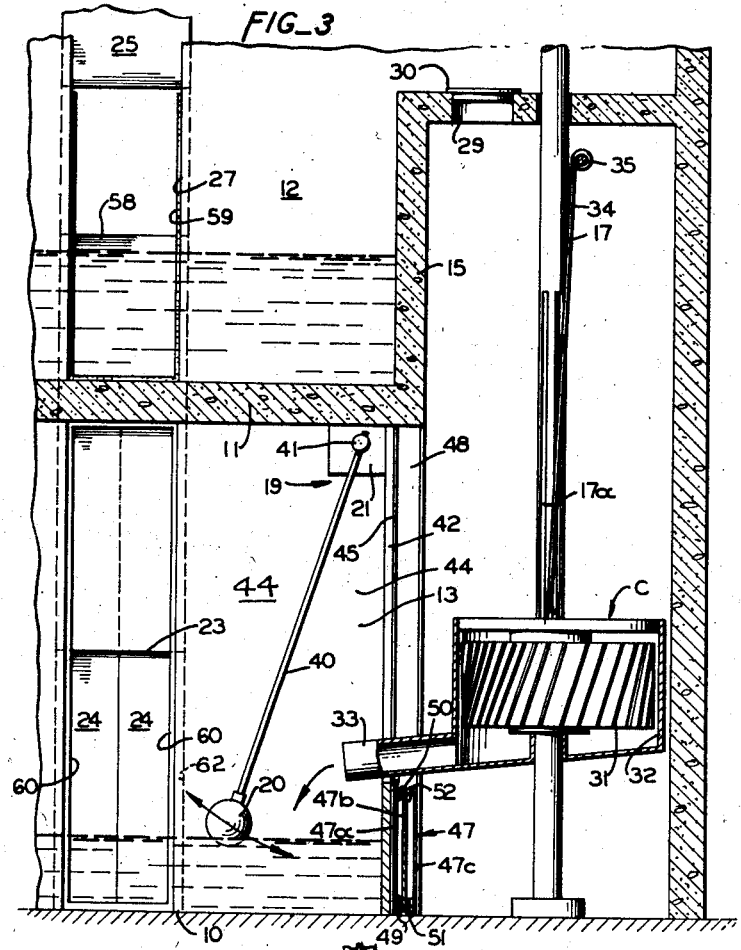
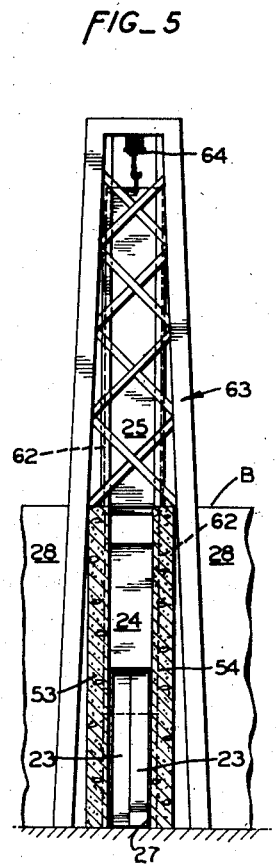
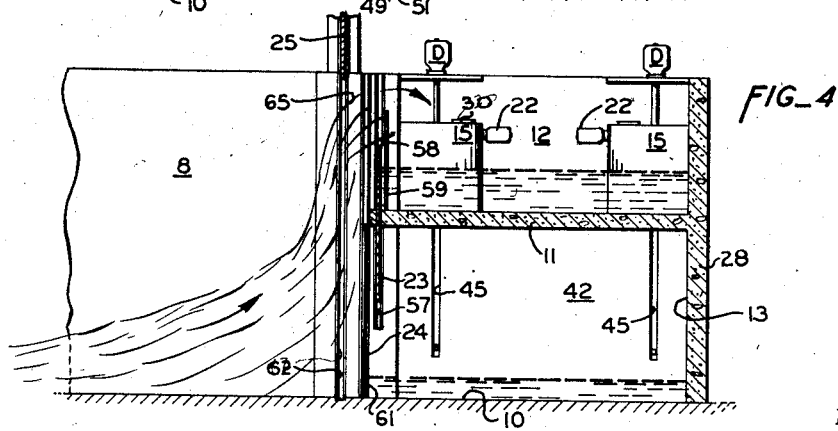
INVENTOR.
JOHN W. SOUTHWICK
BY
ATTORNEYS

United States Patent Office 2,820,148
Patented Jan. 14, 1958

2,820,148

WAVE MOTOR AND ASSOCIATED MECHANISM

John W. Southwick, San Jose, Calif.

Application March 18, 1957, Serial No. 646,848

7 Claims. (Cl. 290—4)

The present invention relates to the utilization of wave energy, and pertains more particularly to a wave motor and associated mechanism.

In the past, wave motors have been developed which employed the energy of incoming waves to elevate water from the waves into a reservoir, and which employed water flowing from such reservoir to operate a water wheel or turbine. Such an arrangement is shown in my Patent No. 1,347,829 issued July 27, 1920.

The invention contemplates the provision of improvements in a wave motor and associated mechanism.

The invention also provides a wave motor which will elevate a maximum available quantity of water from an incoming wave into a storage reservoir, and at the same time will prevent water from such wave from surging into the discharge chamber of the outlet side of a water wheel or turbine.

A further object of the invention is to mount a wave motor turbine for vertical adjustment, and to adjust the height of such wheel proportionately to the existing tidal level.

The invention also provides a pair of shorewardly converging sea walls arranged to direct incoming waves, the height of which is built up by the convergence of the walls, through a gap and into a storage reservoir, means being provided for controlling the height at which wave water is discharged into the reservoir.

Another object of the invention is to provide a wave motor with improved means for controlling and shuttling off wave water when so desired.

These, and other objects and advantages of the invention, will be apparent from the following description and the accompanying drawings, wherein Fig. 1 is a somewhat diagrammatic plan view of a wave motor installation embodying the present invention.

Fig. 2 is an enlarged, fragmentary, sectional view taken along line 2—2 of Fig. 1, a turbine assembly being shown in lowered condition in solid lines, and in elevated condition in broken lines, portions being broken away.

Fig. 3 is a similarly enlarged, fragmentary, sectional view taken along line 3—3 of Fig. 1, portions being broken away.

Fig. 4 is a sectional view taken along line 4—4 of Fig. 1, a gate control tower being broken away.

Fig. 5 is a fragmentary sectional view taken along line 5—5 of Fig. 1.

Briefly, the illustrated embodiment A of the invention is intended to be built on an ocean shore at the apex of a pair of shorewardly converging sea walls 8 and 9.

The unit A as illustrated comprises a two compartment reservoir B, with the floor plan 10 thereof at, or slightly below, the minimum tidal level at the site. The reservoir B is divided by a horizontal partition 11 into an upper water storage compartment 12, and a lower drainage and impeller housing compartment 13. The height of the horizontal partition 11 is above the maximum tidal level at the site, which may be, for example, at the broken line 14 (Fig. 2).

A downwardly open impeller enclosure 15 is provided in each corner of the upper compartment 12, and an impeller unit C is mounted for vertical slidable adjustment on a splined vertical shaft 17 below each enclosure 15. Each impeller unit C receives water from the upper compartment 12 through a flexible conduit or duct 18, and the height of each impeller unit on its shaft is maintained just above the water level in the lower compartment 13 by control means 19 (Fig. 3), which, as illustrated, includes a float 20, servo-mechanism 21, and a geared electric elevator motor 22 (Figs. 1, 2 and 4).

The upper end of each turbine driven shaft 17 has driven connection with a conventional electrical generator D.

A plurality of control gates 23, 24 and 25 are provided for controlling the passage of wave water through a gap opening 27 in the seaward side of the reservoir B, and between the inner ends of the sea walls 8 and 9.

Referring to the drawings in detail, the external walls 28 of the reservoir B may be of reinforced concrete. However, this construction is for the purpose of illustration only, and it is to be understood that the upper water storage compartment 12 may be of much larger extent than the lower compartment 13. In fact, if the site allows, this upper compartment may be in the form of a pond of any desired size, for example, several acres. The horizontal partition 11, which divides the reservoir into upper and lower compartments, and the corner enclosures 15 thereon, also may be of reinforced concrete. Manhole openings 29 are provided, one in each corner enclosure 15 to provide access for workmen between the compartments, and are normally closed by manhole covers 30.

The four corner turbine enclosures 15 are each of a size to admit an impeller unit C upwardly therein when the latter is elevated to its maximum height on its splined shaft 17 as shown in broken lines in Fig. 2. Each turbine unit C comprises a turbine wheel 31, wheel housing 32, and discharge spout 33.

Each turbine wheel 31 is in splined, driving connection with a shaft 17, and each turbine unit C is supported in vertically adjusted position on its shaft by a pair of elevating cables 34, the upper end portions of which are wrapped around an elevator shaft 35. Each of the latter shafts is journaled in bearings 37 and 38, and is in driven connection with its waterproof, geared, elevator motor 22 secured to each turbine enclosure 15.

The flexible duct or conduit 18 for supplying water from the upper compartment 12 to drive each turbine wheel 31 is of suitable diameter, and is connected to communicate, through a control valve 39, from the bottom of the upper compartment 12 onto the turbine wheel.

In order to take advantage of the maximum available head of water, each turbine unit C preferably is kept constantly adjusted to a position on its shaft 17 just above the tidal level in the lower compartment 13. This may be done in different ways, such as, for example by means timed to the levels indicated by the tide tables for the site. As illustrated however, the control of the height of the turbines C on their shafts 17 is by the float control means 19. The latter comprise the float 20, mounted in the lower compartment 13 on an arm 40, which in turn is pivotally mounted on a rock shaft 41.

The rock shaft 41 is operatively connected to the servo-mechanism 21, which controls the action of the elevator motor 22 to raise or lower the turbine units C as required to maintain their discharge spouts 33 just slightly above the water level in the lower compartment. Since such servo-mechanisms are well known, and since the present servo-mechanism per se forms no part of the present invention, it is not illustrated in detail herein.

A pair of upright partition walls 42 and 43, which may be of reinforced concrete formed integrally with the reservoir walls 28, the floor 10, and the horizontal partition 11, divide the portions of the lower compartment 13 along each side thereof, substantially on a line with the inner walls of the turbine enclosures 15, from the remaining central portion 44 (Figs. 1 and 3) of the lower compartment 13. Each of the partition walls 42 and 43 has a pair of upright slotted openings 45 therein in which ride the discharge spouts 33 of the turbine units C on the side of the reservoir partitioned off by the partition wall.

For closing the portion of the slotted opening 45 below each discharge spout 33 riding therein, an extensible gate 47 is mounted in channel guides 48 (Fig. 3) provided one on each side of each slotted opening 45. Each of these gates 47 comprises an outer gate element 47a, connected at its upper end to its discharge spout 33, the lower end 49 of this outer gate element 47a being bent reversely inwardly upon itself.

When the outer gate element 47a is raised a distance substantially equal to its height, its reversely bent lower end 49 has hooked inter-engagement with the similarly, but oppositely, bent upper end portion 50 of a central gate element 47b for raising the latter along with it. Similarly, the reversely bent lower end portion 51 of the central gate element 47b will hook into the reversely bent upper end portion 52 of the inner gate element 47c. Thus, as each turbine unit C is raised, the gate 47 mounted therebeneath will extend to keep the portion of the slotted opening 45 below its discharge spout 33 closed.

The vertical gap 27 in the seaward side of the reservoir B is bounded on two sides by parallel gap walls 53 and 54, which may be of reinforced concrete cast integrally with the reservoir walls 28. The gap 27 is of suitable width, depending upon the size of the reservoir B, to allow the ingress of a desired quantity of water from waves of predetermined height, and, as illustrated, extends throughout the height of the reservoir wall.

The three gate structures 23, 24 and 25 preferably are mounted in channel grooves provided therefor in the gap walls 53 and 54. The inner gate 23, for controlling the height at which wave water is admitted to the upper compartment 12, is mounted for vertical slidable movement in a pair of channels 57 set into the gap walls. The gate 23 is vertically adjustable in its channels by suitable means (not shown) so that it can be elevated or lowered to maintain its upper edge 58 slightly above the water level in the upper compartment 12. The gate 23 preferably is sealed to the gap walls 53 and 54, and to the horizontal partition 11, by rubber sealing strips 59.

Control of the inner gate 23 may be either manual or automatic as designed. For example, float controlled means (not shown) such as that at 19 employed to control the elevation of the turbine units C, but with the float (not shown) mounted in the upper compartment 12, may be provided to control the height of this inner gate.

To prevent the surging of wave water into the lower compartment 13, the check gates 24 are hingedly mounted one on each side of the gap 27. Since these gates 24 are swung back and forth by the action of each incoming wave, the wear on them is severe. In order to facilitate servicing these gates with a minimum of shut down time, they preferably are hingedly mounted one on each side of a rectangular frame 60, which may be of steel. This frame is mounted in channels 61 provided therefor in the gap walls 53 and 54. By this arrangement the entire gate assembly, comprising the frame 60 and gates 24, may be withdrawn vertically from their channels 61, and either repaired or replaced as desired.

As will be noted in Figs. 3 and 4, the check gates 24 extend from the floor 10 to the horizontal partition 11. They are swung to their open condition, shown in broken lines in Fig. 1, by the pressure on their inner faces of water flowing seaward from the lower compartment 13, and are swung to their closed, sealing condition, shown in solid lines in Fig. 1, by the pressure on their outer faces of water from an incoming wave tending to flow into the lower compartment 13.

The outer, or main shut-off gate 25, is mounted for vertical slidable movement between the gap walls 53 and 54 outwardly of the check gates 24. The outer gate 25 is necessarily extremely strong, so as to withstand the pounding of large waves. It is mounted in grooved tracks 62 (Figs. 1, 4 and 5) having their lower portions embedded in the gap walls 53 and 54, and extending upwardly above the gap walls as shown in Fig. 5. The upper extensions of the tracks 62 above the gap walls 53 and 54 are secured to a strongly constructed tower 63, which preferably is of reinforced concrete construction. This outer gate 25 is vertically movable, by suitable hoist means 64, from a maximum elevated open position upwardly clear of the gap walls 53 and 54 as shown in Fig. 5, to fully lowered, closed position. This outer gate is closed whenever it is necessary to work on the other gates 23 and 24 or on any of the equipment in the reservoir B.

In the event that excessively high waves are running, and the upper compartment 12 is full, the outer or main shut-off gate 25 may be partially lowered to a selected position, for example slightly lower than that shown in Fig. 4, where its lower edge is only slightly above the upper edge 58 of the inner sliding gate 23. The lower end of the outer gate 25 will then skim off the upper portion of each wave as it enters the gap 27 and may be adjusted by the hoist 64 to reduce the amount of water entering the upper compartment 12 to an amount approximately equal to that flowing to the turbines C.

The sea walls 8 and 9 are of suitable construction, such as reinforced concrete, to withstand the constant pounding of the waves coursing shoreward therebetween, and are for the purpose of increasing the height of the incoming waves, and for channeling them into the gap 27.

The operation of the illustrated embodiment of the invention is as follows:

Assuming that waves of suitable height are running shoreward between the sea walls 8 and 9, each incoming wave 65 (Fig. 4) gradually increases in height, in accordance with a well known principle, as it approaches the gap 27. With the outer shut-off gate 25 in its open, elevated condition of Fig. 5, as each wave enters the gap 27, it first engages the check gates 24, and, exerting pressure against their outward faces, moves the check gates to closed condition, thereby shutting off further ingress of water into the lower compartment 13.

As each wave of effective height crests in the gap 27 its upper portion, as shown in Fig. 4, will rise above the slidably adjusted inner gate 23, and will flow over this gate, and thence into the upper compartment 12. In the event that excessively high waves are running, the inner gate 23 may be raised, and the outer gate 25 may be lowered to a point where it will cut off the tops of the waves at a desired height and thus will reduce the amount of wave water entering the upper compartment 12.

As water accumulates in the upper compartment 12, the control valve 39 to one or more of the turbine supply ducts 18 is opened, allowing water from the upper compartment 12 to flow by gravity through the duct 18 and thence onto the turbine wheel 31, driving the latter and thereby turning the splined shaft 17 to which each turbine wheel is connected. The rotation of the splined shafts 17 drives the electrical generators D to which these shafts are operatively connected.

Each turbine unit C is maintained, by its height control means 19, at the lowest point on its shaft 17 which will still allow a free gravity flow of water from its discharge spout 33 (Fig. 3) into the lower compartment 13.

The invention provides a simple, compact and effective wave motor mechanism, and one which permits adequate and constant control of the tremendous force of the waves. It is easy to service and maintain, insures a maximum desired recovery of water from the incoming waves, and also automatically provides for the utilization of the maximum available head of water for operating the turbines.

While I have illustrated and described a preferred embodiment of the present invention, it will be understood however, that various changes and modifications may be made in the details thereof without departing from the scope of the invention as set forth in the appended claims.

Having thus described the invention, what I claim as new and desire to protect by Letters Patent is defined in the following claims.

I claim:

1. In a wave motor mounted on an ocean shore and exposed to incoming waves, and comprising a reservoir having an upper water storage compartment above high tide level, and a discharge compartment with its floor substantially at or below low tide level, and a pair of sea walls diverging seawardly from their apex adjacent the seaward side of the reservoir; an entrance gap communicating the apex of the sea walls with the interior of the reservoir and extending throughout the height of the both compartments, a pair of gap walls bounding the gap on both sides, a heavy outer gate mounted for vertical slidable movement between outer portions of said gap walls and movable from a closed condition closing the gap, to elevated condition fully exposing the gap, a check gate frame removably mounted between the gap walls shorewardly of the outer gate, a pair of check gates mounted in said check gate frame and swingable seawardly from closed condition shutting off the ingress of wave water into the lower compartment, to open condition communicating the lower compartment with the ocean outwardly beyond said gap, an inner gate mounted for vertical slidable movement between the gap wall for adjustment from lowered condition wherein the upper edge of the inner gate is slightly above low water level in the storage compartment, to a raised condition wherein the upper edge of the inner gate is substantially at the top of the gap, a drive shaft mounted vertically in the lower compartment, an electric generator in driven connection with said shaft, a water driven turbine mounted for vertical slidable movement on said shaft and in driven relation therewith, and flexible duct means communicating the bottom of the upper compartment with the turbine for supplying water under pressure to the turbine.

2. In a wave motor mounted on an ocean shore and exposed to incoming waves, and comprising a reservoir having an upper water storage compartment above high tide level, and a discharge compartment with its floor substantially at or below low tide level, a pair of sea walls diverging seawardly from their apex adjacent the seaward side of the reservoir; an entrance gap communicating the apex of the sea walls with the interior of the reservoir and extending throughout the height of the upper storage compartment, a pair of gap walls bounding the gap on both sides, a heavy outer gate mounted for vertical slidable movement between outer portions of said gap walls and movable from closed condition closing the gap, to elevated condition fully exposing the gap, check means for preventing ingress of wave water into the lower compartment, an inner gate mounted for vertical slidable movement between the gap walls for adjustment from lowered condition wherein the upper edge of the inner gate is slightly above low water level in the storage compartment, to raised condition wherein the upper edge of the inner gate is substantially at the top of the gap, a drive shaft mounted vertically in the lower compartment, an electric generator in driven connection with said shaft, a water driven turbine mounted for vertical slidable movement on said shaft and in driven relation therewith, flexible duct means communicating the bottom of the upper comparmtent with the turbine for supplying water under pressure to the turbine, and means for maintaining the turbine at a predetermined height above the water in the lower chamber during tidal ebb and flow.

3. In a wave motor mounted on an ocean shore and exposed to incoming waves, and comprising a reservoir having an upper water storage compartment above high tide level, and discharge compartment below the storage compartment with the floor of the lower compartment substantially at or below low tide level and separated from the upper compartment by a horizontal partition, and a pair of sea walls diverging seawardly from their apex adjacent the seaward side of the reservoir; an entrance gap communicating the apex of the sea walls with the interior of the reservoir and extending throughout the height of the upper and lower compartments, a tower mounted to straddle said gap, track means at each side of said gap and continuing up along said tower, a heavy outer gate mounted on said track means for vertical slidable movement within said gap, hoist means on the tower for moving said outer gate from closed condition closing the gap, to elevated condition alongside said tower and fully exposing the gap, check means for preventing ingress of wave water into the lower compartment, means for controlling the depth of water in the upper compartment, a drive shaft mounted vertically in the lower compartment, an electric generator in driven connection with said shaft, a water driven turbine mounted on said shaft and in driven relation therewith, and duct means communicating the bottom of the upper compartment with the turbine for supplying water under pressure to the turbine.

4. In a wave motor mounted on an ocean shore and exposed to incoming waves, and comprising a reservoir having an upper water storage compartment above high tide level, and discharge compartment below the storage compartment with the floor of the lower compartment substantially at or below low tide level a horizontal partition separating the upper and lower compartments, and a pair of sea walls diverging seawardly from their apex adjacent the seaward side of the reservoir; an entrance gap communicating the apex of the sea walls with the interior of the reservoir and extending throughout the height of the upper and lower compartments, a heavy outer gate mounted for vertical slidable movement in said gap, hoist means for moving said outer gate from closed condition closing the gap, to elevated condition fully exposing the gap, a gate slidably mounted in the portion of the gap communicating with the upper compartment, check means for preventing ingress of wave water into the lower compartment, a downwardly open watertight enclosure on the partition separating the upper and lower compartments, a drive shaft mounted vertically in the lower compartment and extending upwardly through said enclosure, an electric generator mounted above said enclosure and in driven connection with said shaft, a water driven turbine mounted for slidable movement on said shaft and in driven relation therewith, said turbine being of a size to enter the open, under side of said enclosure, control means for moving the turbine along said shaft in accordance with changes in the water level in the lower compartment from fully elevated condition wherein the turbine is within the enclosure, to fully lowered condition wherein the turbine is just slightly above low tide level, and flexible duct means communicating the bottom of the upper compartment with the turbine for supplying water under pressure to the turbine.

5. An arrangement according to claim 4 wherein the means for controlling the height of the turbine on its shaft comprises an electric motor, elevator means operatively connecting the motor to the turbine, a servo-mechanism for controlling the electric motor, and a float mounted in the lower compartment and operatively connected to the servo-mechanism.

6. In a wave motor mounted on an ocean shore and exposed to incoming waves, and comprising a reservoir having an upper water storage compartment above high tide level, and a discharge compartment with its floor substantially at or below low tide level, and a pair of sea walls diverging seawardly from an apex adjacent the seaward side of the reservoir; an entrance gap communicating the apex of the sea walls with the interior of the reservoir and extending throughout the height of the upper storage compartment, a heavy outer gate mounted for vertical slidable movement within said gap and movable from a closed condition closing the gap, to elevated condition fully exposing the gap, check means for preventing ingress of wave water into the lower compartment, an inner gate mounted for vertical slidable movement in the gap inwardly of the outer gate and movable vertically from lowered condition wherein the upper edge of the inner gate is slightly above low water level in the storage compartment, to raised condition wherein the upper edge of the inner gate is substantially at the top of the gap, a pair of drive shafts mounted vertically one on each side of the lower compartment, an electric generator in driven connection with each of said shafts, a water driven turbine mounted for axial slidable movement on each of said shafts and in driven relation therewith, flexible duct means communicating the bottom of the upper compartment with each turbine for supplying water under pressure to the turbines, an upright wall adjacent each turbine and separating each said turbine from a central portion of the lower compartment, each upright wall having a vertical slot therein adjacent the turbine separated from the central portion of the lower compartment by such wall, and a discharge spout on each turbine and extending through the slot in the upright slotted wall adjacent thereto, whereby the water discharged from the turbines is conducted through said vertical walls to the portion of the lower chamber therebetween.

7. An arrangement according to claim 6 wherein a plurality of gate panels are mounted for vertical slidable movement in each of said slots below the discharge spout therein, means connecting one of said gates to the spout thereabove, and link means successively connecting each gate panel to the one adjacent thereto upon a predetermined elevation of the spout in its slot, thereby to close off the portion of the slot below the spout during elevation of its turbine.

References Cited in the file of this patent
UNITED STATES PATENTS

| | | |
|---|---|---|
| Re. 11,807 | Rogowski | Jan. 30, 1900 |
| 526,082 | Merritt | Sept. 18, 1894 |
| 655,431 | Boisrame | Aug. 7, 1900 |
| 1,009,085 | Hale | June 2, 1914 |
| 1,347,829 | Southwick | July 27, 1920 |